(12) United States Patent
Lee et al.

(10) Patent No.: US 8,450,909 B2
(45) Date of Patent: May 28, 2013

(54) PIEZOELECTRIC POWER GENERATING APPARATUS

(75) Inventors: Hsien-Hua Lee, Kaohsiung (TW); Teng-Chieh Tsou, Kaohsiung (TW)

(73) Assignee: National Sun Yat-Sen University, Kaohsiung (TW)

( * ) Notice: Subject to any disclaimer, the term of this patent is extended or adjusted under 35 U.S.C. 154(b) by 457 days.

(21) Appl. No.: 12/907,120

(22) Filed: Oct. 19, 2010

(65) Prior Publication Data

US 2011/0248605 A1    Oct. 13, 2011

(30) Foreign Application Priority Data

Apr. 12, 2010 (TW) .............................. 99111332 A

(51) Int. Cl.
  *H02N 2/18*    (2006.01)
(52) U.S. Cl.
  USPC ........................................................ 310/339
(58) Field of Classification Search
  USPC .......................................................... 310/339
  IPC ....................................................... H02N 2/186
  See application file for complete search history.

(56) References Cited

U.S. PATENT DOCUMENTS

| | | | | |
|---|---|---|---|---|
| 3,350,583 | A * | 10/1967 | Schiavone | 310/319 |
| 4,952,836 | A * | 8/1990 | Robertson | 310/339 |
| 6,194,815 | B1 * | 2/2001 | Carroll | 310/339 |
| 6,376,968 | B1 * | 4/2002 | Taylor et al. | 310/339 |
| 6,806,621 | B2 * | 10/2004 | Heim et al. | 310/328 |
| 7,239,066 | B2 * | 7/2007 | Ott et al. | 310/339 |
| 7,345,407 | B2 * | 3/2008 | Tanner | 310/339 |
| 7,511,404 | B2 * | 3/2009 | Lee | 310/339 |
| 7,821,183 | B2 * | 10/2010 | Rastegar | 310/339 |
| 8,247,952 | B2 * | 8/2012 | Chang | 310/339 |
| 8,294,336 | B2 * | 10/2012 | Priya | 310/339 |
| 2002/0121844 | A1 * | 9/2002 | Ghandi et al. | 310/339 |
| 2011/0095654 | A1 * | 4/2011 | Steinkopff et al. | 310/339 |
| 2011/0260583 | A1 * | 10/2011 | Lee et al. | 310/339 |
| 2012/0007473 | A1 * | 1/2012 | Oh | 310/339 |
| 2012/0074815 | A1 * | 3/2012 | Jean-Mistral | 310/339 |
| 2012/0169055 | A1 * | 7/2012 | Rastegar et al. | 290/53 |

FOREIGN PATENT DOCUMENTS

JP        2005237156 A  *  9/2005

* cited by examiner

*Primary Examiner* — Jaydi San Martin
(74) *Attorney, Agent, or Firm* — Jackson IPG PLLC

(57) ABSTRACT

A piezoelectric power generating apparatus comprises a frame body having an axis line, a moving member and a plurality of piezoelectric portions. The moving member is penetrated into the frame body. Each of the piezoelectric portions comprises a first end and a second end. Each of the first ends is fixed at the frame body and each of the second ends is fixed at the moving member. The moving member is moved back and forth along the axis line of the frame body.

16 Claims, 6 Drawing Sheets

PIEZOELECTRIC POWER GENERATING APPARATUS

FIELD OF THE INVENTION

The present invention is generally relating to a piezoelectric power generating apparatus, more particularly to a piezoelectric power generating apparatus that can drive a plurality of piezoelectric portions in the mean time.

BACKGROUND OF THE INVENTION

Referring to FIG. 1 as disclosed in U.S. Pat. No. 7,239,066. A piezoelectric power generating apparatus 400 comprising a plurality of piezoelectric portions 410, a driver 420 and a frame body 430. Each of the piezoelectric portions comprises a fixing end 411 and a free end 412, and each of the fixing ends is fixed at the frame body 430. The driver 420 has a lobe 421 and rotatably drives the lobe 421 to poke the free end 412 of each of the piezoelectric portions 410 thereby enabling each of the piezoelectric portions to deform and generate output voltage. Owning to the oscillation frequency from each of the piezoelectric portions 410 poked by the lobe 421 is not the same, that means, the restoring time of each of the piezoelectric portions 410 after being poked by the lobe 421 is different. Therefore, when the driver 420 is in rotation, each of the piezoelectric portions 410 is not able to be effectively poked by the lobe 421, and each of the piezoelectric portions 410 can not provide a stable and identical output voltage. Moreover, when the lobe 421 is actuated by the driver 420, the poked direction of the lobe 421 is opposite compared with the restoring direction of each of the piezoelectric portions 410, which results mechanical interference to lead destruction between the lobe 421 and the piezoelectric portions 410.

SUMMARY

A primary object of the present invention is to provide a piezoelectric power generating apparatus comprises a frame body having an axis line, a moving member penetrated into the frame body and a plurality of piezoelectric portions having a first end and a second end. Each of the first ends is fixed at the frame body, each of the second ends is fixed at the moving member, and the moving member is actuated to move back and forth along the axis of the frame body. By means of the moving member to move back and forth in the frame body, the piezoelectric portions are actuated simultaneously to deform by the moving member to produce the same deformation, oscillation frequency and output voltage. Besides, with the same deformation of the piezoelectric portions, each of the piezoelectric portions is not capable of producing mechanical interference. Moreover, by increasing the quantities of the frame body and the piezoelectric portions to significantly raise the output power of the piezoelectric power generating apparatus.

A secondary object of the present invention is to provide a piezoelectric power generating apparatus, wherein the second end of each of the piezoelectric portions is formed into a tapered-shape that the quantity of each of the piezoelectric portions fixed at the moving member can be increased. Besides, the tapered-shape of the second ends may prevent stack and extruding from each of the second ends to avoid interference and assembling inconvenience of each of the piezoelectric portions.

DETAILED DESCRIPTION OF THE INVENTION

Figure 1:
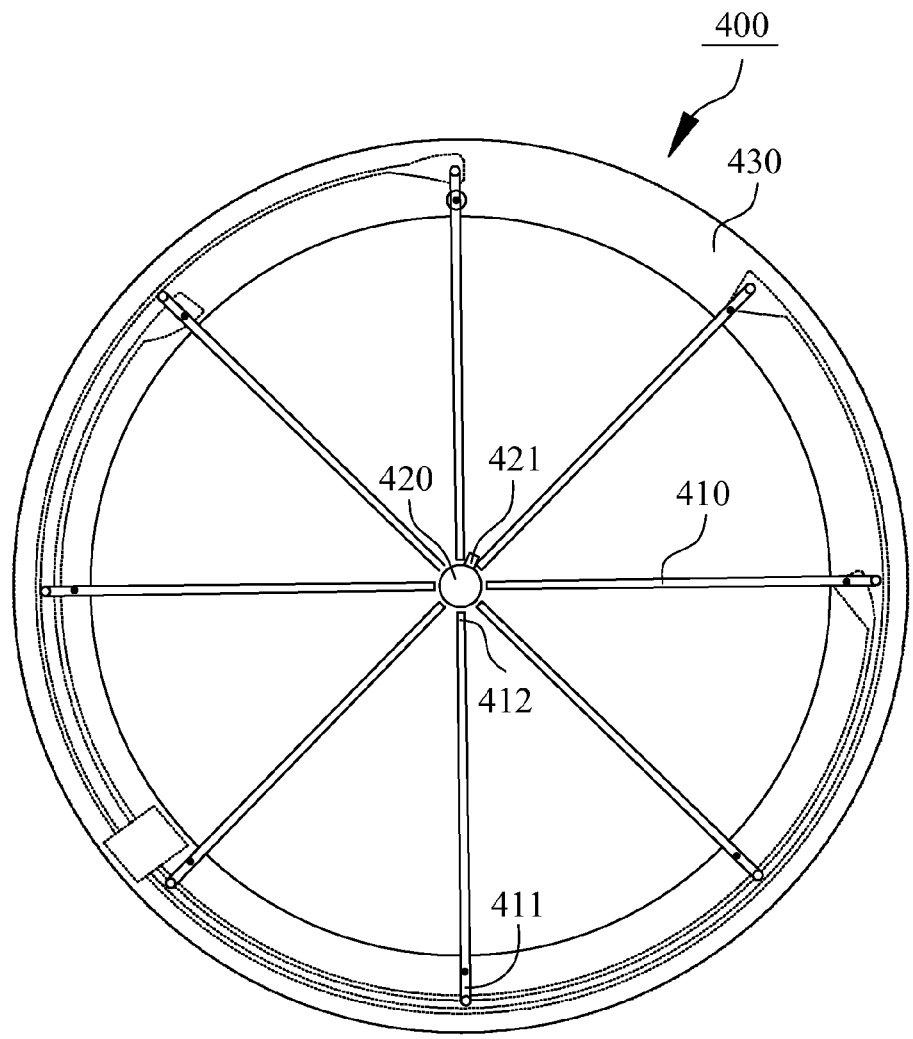
FIG. 1 is a top view illustrating conventional piezoelectric power generating apparatus.
Figure 2:
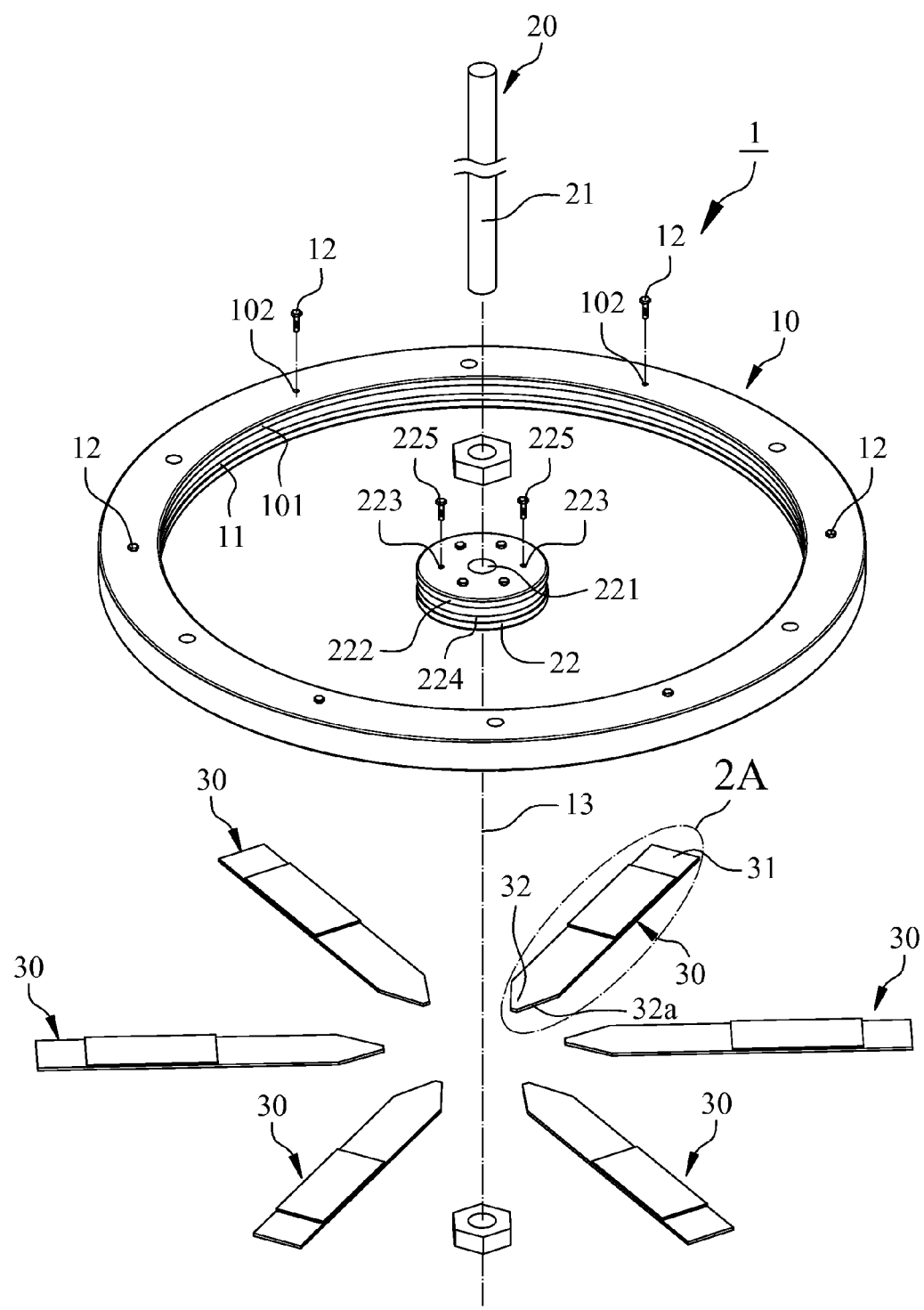
FIG. 2 is a perspective exploded view illustrating a piezoelectric power generating apparatus in accordance with an embodiment of the present invention.
Figure 4:
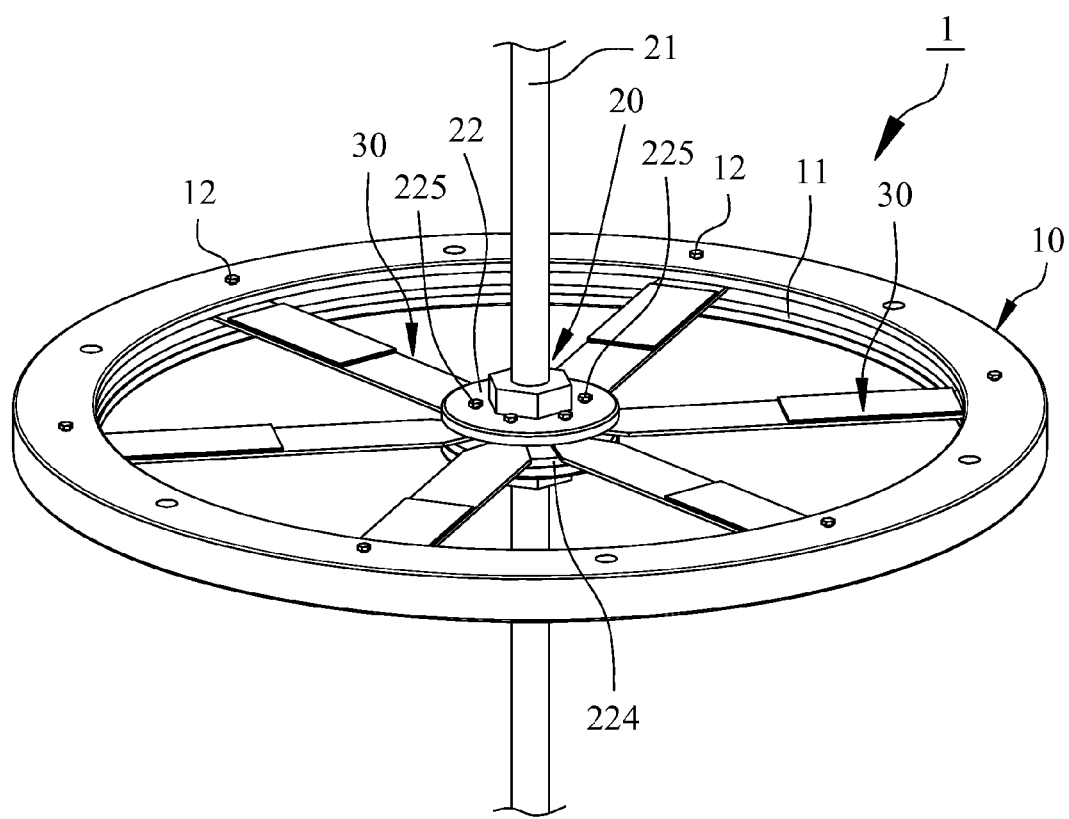
FIG. 4 is a perspective assembly view illustrating the piezoelectric power generating apparatus in accordance with an embodiment of the present invention.
Figure 5:
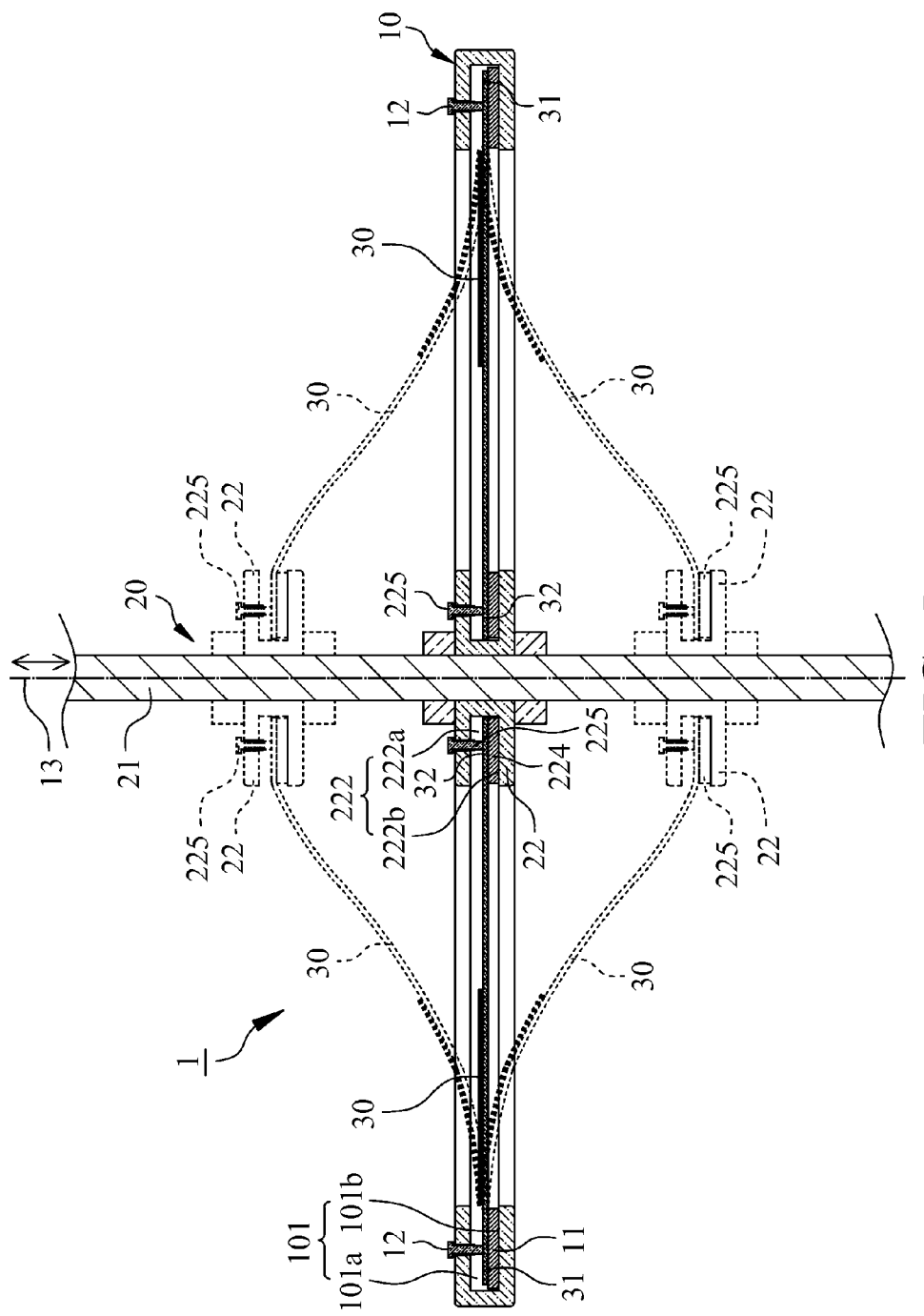
FIG. 5 is an action diagram illustrating the piezoelectric power generating apparatus in accordance with an embodiment of the present invention.

Referring to FIGS. 2, 4 and 5, a piezoelectric power generating apparatus 1 in accordance with an embodiment of the present invention comprises a frame body 10 having an axis line 13, a moving member 20 and a plurality of piezoelectric portions 30, the moving member 20 is penetrated into the frame body 10, each of the piezoelectric portions 30 comprises a first end 31 and a second end 32, each of the first end 31 is fixed at the frame body 10, each of the second ends 32 is fixed at the moving member 20, and the moving member 20 is capable of being moved back and forth along the axis line 13 to actuate the piezoelectric portions 30 simultaneously to generate deformation.

Figure 2A:
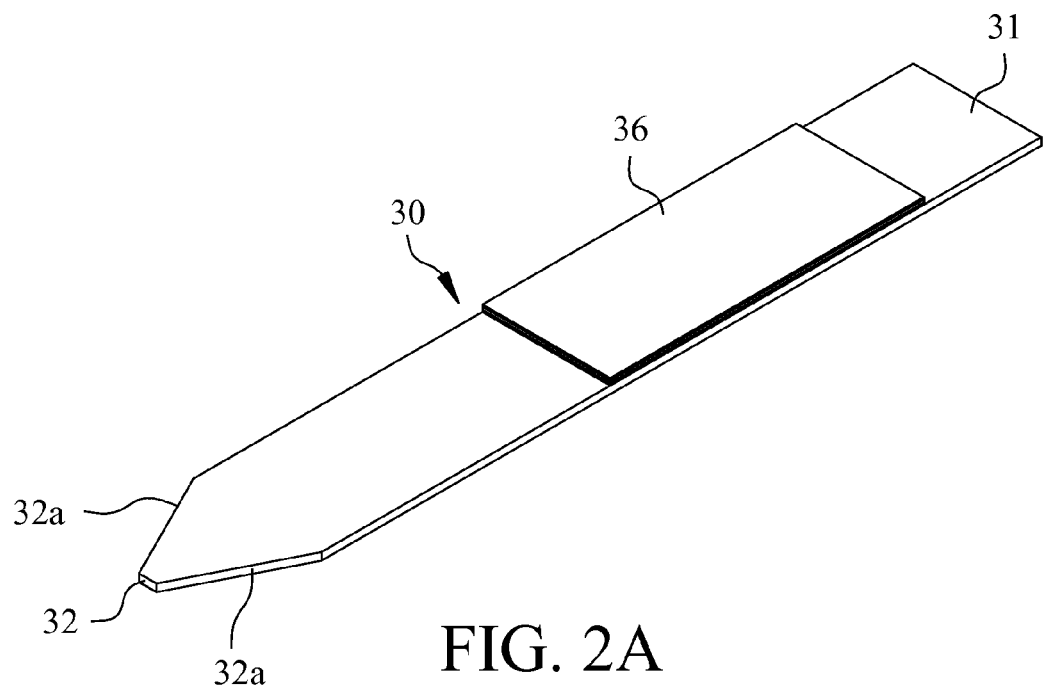
FIG. 2A is a drawing of partial enlargement of FIG. 2 illustrating the piezoelectric power generating apparatus in accordance with an embodiment of the present invention.
Figure 3:
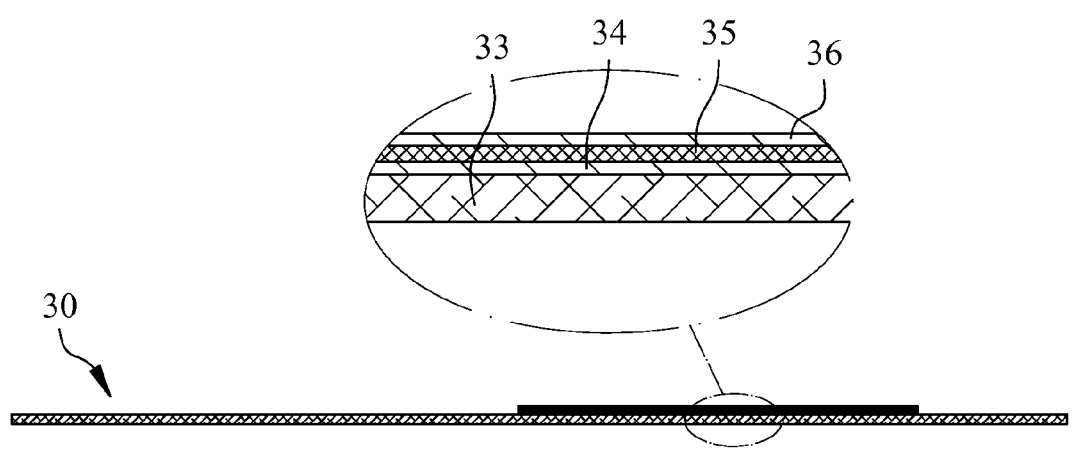
FIG. 3 is a lateral section view of the piezoelectric portion illustrating the piezoelectric power generating apparatus in accordance with an embodiment of the present invention.

Referring to FIGS. 2, 4 and 5 again, in this embodiment, the frame body 10 comprises an inner wall 101 and a slot 101a recessed into the inner wall 101. The moving member 20 comprises a rod 21 and at least one clamping device 22 having a combination hole 221, and the rod 21 is penetrated through the combination hole 221. Or, the rod 21 and the clamping device 22 are formed into one piece, and the clamping device 22 comprises an outer wall 222 and a annulus slot 222a recessed into the outer wall 222. The first end 31 of each of the piezoelectric portions 30 is fixed at the slot 101a of the frame body 10, and each of the second ends 32 is fixed at the annulus slot 222a of the clamping device 22. With reference to FIG. 3, each of the piezoelectric portions 30 comprises a metal layer 33, a first protection layer 34 formed on each of the metal layers 33, a piezoelectric layer 35 formed on each of the protection layer 34 and a second protection layer 36 formed on each of the piezoelectric layer 35. With reference to FIGS. 2, and 2A, in this embodiment, the second end 32 of each of the piezoelectric portions 30 is formed into a tapered-shape 32a, and the quantity of each of the piezoelectric portions 30 fixed at the annulus slot 222a can be increased via the tapered shape 32a of the second end 32. Besides, the tapered-shape 32a of the second ends may prevent stack and extruding from each of the second end 32 to avoid interference and assembling inconvenience of each of the piezoelectric portions 30 when each of the second ends 32 is fixed at the annulus slot 222a. In this embodiment, the clamping device 22 can be actuated by the rod 21 to move back and forth along the axis line 13 in the frame body 10. Owing to the piezoelectric portions 30 are actuated simultaneously by the moving member 20, each of the piezoelectric portions 30 possesses the same deformation and generates the same oscillation frequency and output voltage. Besides, with the same deformation of the piezoelectric portions 30, the mechanical interference between each of the piezoelectric portions 30 can be effectively avoided.

Referring to FIG. 5, in this embodiment, the frame body 10 comprises at least one first spacing member 11 recessed into the slot 101a, the first end 31 of each of the piezoelectric portions 30 is disposed on the first spacing member 11, and the first spacing member 11 is utilized for height adjustment of each of the piezoelectric portions 30. In this embodiment, the inner wall 101 further has a contact surface 101b, and the first spacing member 11 is disposed between each of the piezoelectric portions 30 and the contact surface 101b. The frame body 10 further has a plurality of through holes 102 and a plurality of fixing members 12, the through holes 102 are in contact with the slot 101a, each of the fixing members 12 is located at each of the through holes 102, and one end of each of the fixing members 12 is contacted and compressed with the first end 31 of each of the piezoelectric portions 30 to enable the first end 31 of each of the piezoelectric portions 30 to be fixed in the slot 101a of the frame body 10. In this embodiment, the fixing member 12 can be a bolt, besides, the clamping device 22 of the moving member 20 comprises at least one second spacing member 224 disposed into the annulus slot, the second end 32 of each of the piezoelectric portions 30 is disposed on the second spacing member 224, and the second spacing member 224 is utilized for height adjustment of each of the piezoelectric portions 30. In this embodiment, the outer wall 222 comprises a touch surface 222b, and the second spacing member 224 is disposed between each of the piezoelectric portions 30 and the touch surface 222b. Furthermore, the clamping device 22 further comprises a plurality of penetrating holes 223 and a plurality of positioning members 225, the penetrating holes 223 are in contact with the annulus slot 222a, each of the positioning members 225 is located at each of the penetrating holes 223, and one end of each of the positioning members 225 is contacted and compressed with the second end 32 of each of the piezoelectric portions 30 to enable the second end 32 of each of the piezoelectric portions 30 to be fixed in the annulus slot 222a of the clamping device 22. In this embodiment, each of the positioning members 225 can be a bolt.

Referring to FIG. 5 again, the moving member 20 can be driven by a driving member (not shown in the drawings), when the moving member 20 is not actuated by the driving member, the piezoelectric portions 30 are coplanar. In this embodiment, the moving member 20 can be driven by the driving member to move back and forth along the axis line 13 in the frame body 10, the moving member 20 is located at the axis line 13 of the frame body 10, and the axis line 13 is a center line of the frame body 10.

Figure 6:
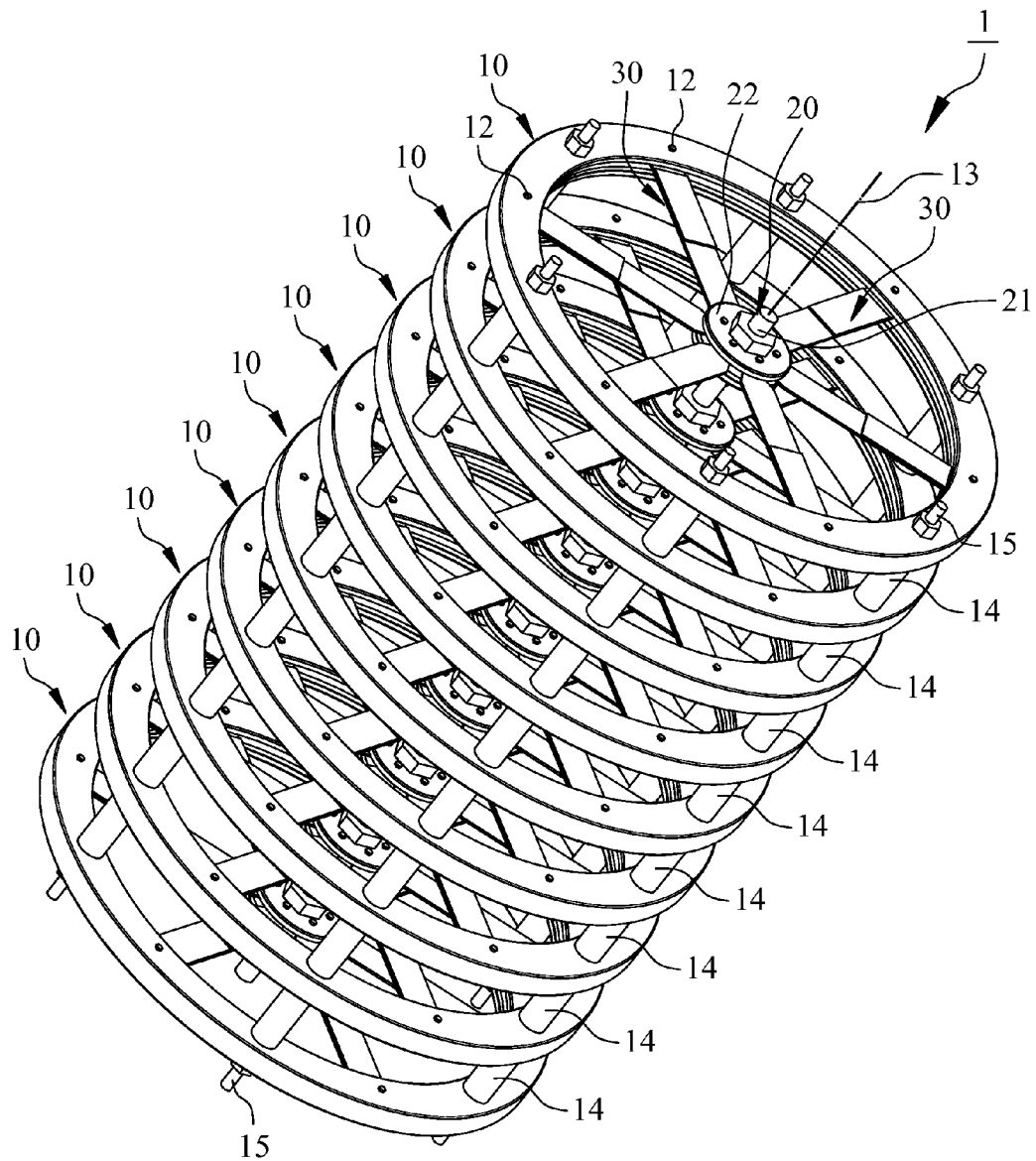
FIG. 6 is another perspective assembly view illustrating the piezoelectric power generating apparatus in accordance with an embodiment of the present invention.

Referring to FIG. 6, the piezoelectric power generating apparatus 1 indicates that the moving member 20 is penetrated through a plurality of frame bodies 10, the moving member 20 comprises the rod 21 and a plurality of clamping devices 22, each of the first ends 31 is fixed at each of the frame bodies 10 and each of the second ends 32 is fixed at each of the clamping devices 22. The piezoelectric power generating apparatus 1 further comprises a plurality of fixing portions 14 and a plurality of penetrating rods 15, each of the fixing portions 14 is disposed between two adjacent frame bodies 10, and each of the penetrating rods 15 is penetrated through each of the fixing portions 14 and the frame bodies 10 to fix the frame bodies 10. By increasing the quantity of the frame bodies 10 and the piezoelectric portions 30, the output power of the piezoelectric power generating apparatus 1 can be effectively raised, and enables the output voltage of the piezoelectric power generating apparatus 1 to possess variability. The piezoelectric portions 30 can be driven by the moving member 20 to enable the piezoelectric portions 30 to have the same deformation and oscillation frequency to prevent mechanical interference.

While this invention has been particularly illustrated and described in detail with respect to the preferred embodiments thereof, it will be clearly understood by those skilled in the art that is not limited to the specific features shown and described and various modified and changed in form and details may be made without departing from the spirit and scope of this invention.

What is claimed is:

1. A piezoelectric power generating apparatus comprising:
   at least one frame body having an axis line;
   a moving member penetrated into the frame body; and
   a plurality of piezoelectric portions, each of the piezoelectric portions has a first end and a second end, each of the first ends is fixed at the frame body, each of the second ends is fixed at the moving member, and the moving member is moved back and forth along the axis line.

2. The piezoelectric power generating apparatus in accordance with claim 1, wherein the moving member is located at the axis line of the frame body.

3. The piezoelectric power generating apparatus in accordance with claim 1, wherein the frame body comprises an inner wall and a slot recessed into the inner wall, and the first end of each of the piezoelectric portions is fixed at the slot.

4. The piezoelectric power generating apparatus in accordance with claim 3, wherein the frame body further comprises at least one first spacing member, and the first end of each of the piezoelectric portions is disposed on the first spacing member.

5. The piezoelectric power generating apparatus in accordance with claim 3, wherein the frame body further has a plurality of through holes and a plurality of fixing members, the through holes are in contact with the slot, each of the fixing members is located at each of the through holes, and one end of each of the fixing members is contacted and compressed with each of the piezoelectric portions.

6. The piezoelectric power generating apparatus in accordance with claim 1, wherein the moving member comprises a rod.

7. The piezoelectric power generating apparatus in accordance with claim 6, wherein the moving member further comprises at least one clamping device, the clamping device can be actuated by the rod to move back and forth along the axis line.

8. The piezoelectric power generating apparatus in accordance with claim 7, wherein the clamping device comprises an outer wall and an annulus slot recessed into the outer wall, and the second end of each of the piezoelectric portions is fixed at the annulus slot.

9. The piezoelectric power generating apparatus in accordance with claim 7, wherein the clamping device has a combination hole, and the rod is penetrated through the combination hole.

10. The piezoelectric power generating apparatus in accordance with claim 7, wherein the clamping device comprises at least one second spacing member disposed into the annulus slot, and the second end of each of the piezoelectric portions is disposed on the second spacing member.

11. The piezoelectric power generating apparatus in accordance with claim 7, wherein the clamping device further comprises a plurality of penetrating holes and a plurality of positioning members, each of the penetrating holes is in contact with the annulus slot, each of the positioning members is located at each of the penetrating holes, and one end of each of the positioning members is contacted and compressed with each of the piezoelectric portions.

12. The piezoelectric power generating apparatus in accordance with claim 1, wherein the second end of each of the piezoelectric portions is formed into a tapered-shape.

13. The piezoelectric power generating apparatus in accordance with claim 1, wherein the piezoelectric portions are coplanar.

14. The piezoelectric power generating apparatus in accordance with claim 1, wherein the axis line is a center line of the frame body.

15. The piezoelectric power generating apparatus in accordance with claim 1 further comprises a plurality of fixing portions, and each of the fixing portions is disposed between two adjacent frame bodies.

16. The piezoelectric power generating apparatus in accordance with claim 15 further comprises a plurality of penetrating rod, and each of the penetrating rods is penetrated through each of the fixing portions and the frame bodies.

* * * * *